United States Patent
Su et al.

(10) Patent No.: US 6,691,089 B1
(45) Date of Patent: Feb. 10, 2004

(54) USER CONFIGURABLE LEVELS OF SECURITY FOR A SPEAKER VERIFICATION SYSTEM

(75) Inventors: Huan-yu Su, San Clemente, CA (US); Khaled Assaleh, Mission Viejo, CA (US)

(73) Assignee: Mindspeed Technologies Inc., Newport Beach, CA (US)

( * ) Notice: Subject to any disclaimer, the term of this patent is extended or adjusted under 35 U.S.C. 154(b) by 0 days.

(21) Appl. No.: 09/409,942

(22) Filed: Sep. 30, 1999

(51) Int. Cl.[7] .......................... G10L 15/06; G10L 17/00
(52) U.S. Cl. .................... 704/244; 704/250; 704/273
(58) Field of Search ............................ 704/243, 244, 704/246, 270, 273, 275, 247, 250

(56) References Cited

U.S. PATENT DOCUMENTS

| | | | |
|---|---|---|---|
| 5,724,481 A | * 3/1998 | Garberg et al. ............. 704/243 |
| 5,774,858 A | * 6/1998 | Taubkin et al. ............. 704/273 |
| 5,805,674 A | * 9/1998 | Anderson, Jr. ............. 704/243 |
| 5,913,196 A | * 6/1999 | Talmor et al. ............. 704/270 |
| 5,940,799 A | 8/1999 | Bruckert et al. |
| 5,960,397 A | * 9/1999 | Rahim ......................... 704/244 |
| 5,963,908 A | 10/1999 | Chadha |
| 6,088,669 A | * 7/2000 | Maes ........................... 704/231 |
| 6,107,935 A | * 8/2000 | Comerford et al. ......... 340/5.52 |
| 6,119,084 A | * 9/2000 | Roberts et al. ............. 704/246 |
| 6,182,037 B1 | * 1/2001 | Maes ........................... 704/247 |
| 6,253,181 B1 | * 6/2001 | Junqua ........................ 704/255 |
| 6,272,463 B1 | * 8/2001 | Lapere ........................ 704/231 |
| 6,389,393 B1 | * 5/2002 | Gong ........................... 704/244 |
| 6,556,127 B1 | * 4/2003 | Moser et al. ............... 340/5.84 |

FOREIGN PATENT DOCUMENTS

| | | |
|---|---|---|
| EP | 0 892 387 | 1/1999 |
| WO | WO 99/42992 | 8/1999 |

OTHER PUBLICATIONS

Vloeberghs et al.; "La Reconnaissance Du Locuteur Sur Des Liasons Par Vocodeurs"; Revue HF, Soc. Belge Des Ing. Des Telecomm. & D'Electronique; Ophain, BE; vol. 17, No. Jan. 2, 2003; 1993; pp. 119–127.

* cited by examiner

Primary Examiner—Richemond Dorvil
Assistant Examiner—Martin Lerner
(74) Attorney, Agent, or Firm—Farjami & Farjami LLP

(57) ABSTRACT

A text-prompted speaker verification system that can be configured by users based on a desired level of security. A user is prompted for a multiple-digit (or multiple-word) password. The number of digits or words used for each password is defined by the system in accordance with a user set preferred level of security. The level of training required by the system is defined by the user in accordance with a preferred level of security. The set of words used to generate passwords can also be user configurable based upon the desired level of security. The level of security associated with the frequency of false accept errors verses false reject errors is user configurable for each particular application.

40 Claims, 6 Drawing Sheets

USER CONFIGURABLE LEVELS OF SECURITY FOR A SPEAKER VERIFICATION SYSTEM

BACKGROUND OF THE INVENTION

1. Field of the Invention

The present invention relates generally to a system and method for providing a speaker verification system with user selectable levels of security.

2. Related Art

The increased use of consumer electronic devices and computer controlled remote services has heightened concerns over security issues. One of the primary security concern is the risk of access by unauthorized users. In order to safeguard against unauthorized use, passwords and/or user identification codes are generally provided.

Therefore, users of these devices and services are required to memorize and maintain a variety of passwords and/or user identification codes (user IDs) to maintain security. For example, user IDs and/or passwords (hereinafter separately and/or collectively referred to as passwords) are generally required when using ATM cards, credit cards, telephone calling cards, bank accounts, residential security systems, personal computer systems, remote computer services, voice mail systems, pagers, cellular telephones and personal digital assistants (PDAs).

It has become apparent that users are finding it difficult and inconvenient to memorize and maintain these passwords. This is especially true for users of multiple devices and/or services. The consequence of this inconvenience almost always results in some sort of breach of security. For example, rather than commit multiple passwords to memory, many users will write them down and thereby increase the risk of misappropriation. In another example, this inconvenience causes users to avoid setting up optional passwords altogether. In yet another example, users tend to use trivial passwords, such as their birth dates that are easily compromised. In addition, many users tend to use the same passwords across multiple systems. Thus, if one password is compromised, all of them are.

Therefore, to alleviate this increasing and prevailing problem, what is needed is a system and method for maintaining a high level of security that avoids the inconveniences found in current password authorization systems.

SUMMARY OF THE INVENTION

Accordingly, the present invention is directed toward a system and method for providing a security system that avoids inconveniences and problems found in conventional systems. The system and method of the present invention uses a text-prompted speaker verification system to accept randomly generated verbal passwords from users. The system and method of the present invention can be used with any type of electronic device and/or any type of computer controlled local or remote automated service. In fact, the present invention can be used in any system where passwords may be utilized.

The present invention prompts the user (either verbally or textually) for a multiple-digit (or multiple-word) password used for gaining access to the system. The number of digits or words used for each password is defined by the system in accordance with a preferred level of user security. In addition, the level of training required by the system is user configurable and based on the desired level of security.

Further, the ease of system access is user configurable and based on a desired level of security. Specifically, in accordance with a preferred embodiment of the present invention, the types of errors that may be generated by the system are user configurable. This is accomplished by allowing the user to adjust the acceptable frequency of errors between the two types of possible errors, false accepts and false rejects.

Once a particular level of security is defined by a user, the user gains access to the system by uttering a randomly generated password as prompted by the system. The number of words or digits used for the password, the amount of user training required, and the acceptable error frequency and type, are all configured by the user based on a desired level of security as defined by the user for each particular application.

BRIEF DESCRIPTION OF THE FIGURES

The present invention is described with reference to the accompanying drawings, wherein.

In the figures, like reference numbers generally indicate identical, functionally similar, and/or structurally similar elements.

DETAILED DESCRIPTION OF THE PREFERRED EMBODIMENTS

Figure 1:
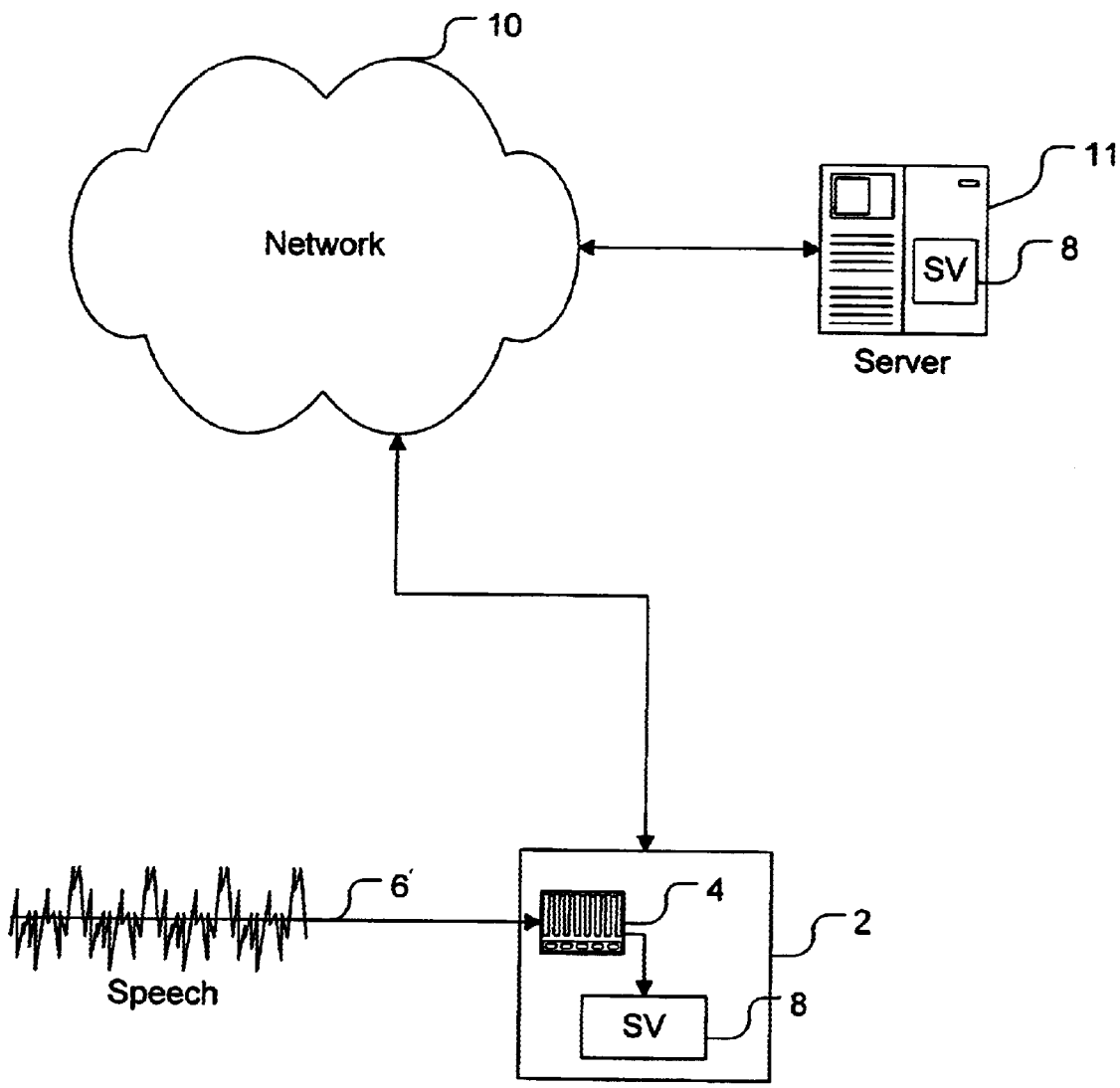
FIG. 1 is a block diagram depicting a typical operational environment according to an embodiment of the present invention.

The present invention is directed toward a system and method for providing a speaker verification system with user selectable levels of security. Automatic speech recognition is a rapidly evolving area in the field of voice processing. This technology is generally divided into two primary areas referred to as speech recognition and speaker recognition.

While speech recognition is concerned with the message conveyed by the spoken utterance, speaker recognition is only concerned with the identity of the person speaking the utterance. The present invention is preferably used with a system that provides speaker recognition, but can also be used with speech recognition systems.

Speaker recognition refers to the capability to identify or verify a user's identity based on his or her voice. Speaker recognition systems can be further broken down into two categories, namely speaker identification and speaker verification systems. In general, a speaker identification system processes a voice sample to determine the identity of a person within a group of persons "known" to the system. Groups of persons are "known" to the system through a series of one or more training sessions, where each "known" person's voice biometrics are captured and stored.

Thus, a particular person is identified by the speaker identification system by comparing a current speech sample with the series of stored biometrics and selecting the person with the closest match. The output of a speaker identification system is therefore, the identity of a particular speaker.

A speaker verification system is less complex than a speaker identification system. Speaker verification systems typically process voice samples to determine whether it matches a single pre-identified person. Thus, the output from a speaker verification system is binary, (i.e. either a match or a mismatch). In a preferred embodiment of the present invention, a speaker verification system is used.

Accordingly, in the examples presented herein, a speaker verification system is used to describe the present invention. However, in other embodiments, different types of speech recognition systems can be used, including, among other types, speaker identification systems. Accordingly, the use of a speaker verification system to describe the present invention should not be construed to limit the scope and breadth of the present invention.

Further, generally, two types of speaker verification system exist, namely, text dependent and text independent systems. A text independent speaker verification system has no restriction as to the spoken utterance evaluated by the system. That is, these systems allow the user to utter any word or phase. The word or phase is then evaluated to determine whether a match or a mismatch occurs.

The problem with text independent systems is that they require complex training. Further these systems require increased computational and storage requirements than text dependent systems. In addition, text independent systems are less secure when used for security purposes because any utterance of an enrolled speaker can result in a match. This enables, for example, unauthorized users to break into a system by obtaining any voice recording from an authorized user. As described below, the preferred system randomly generates a different password on each occasion and is therefore not prone to this type of break-in.

For these reasons, the present invention is preferably used in conjunction with text dependant systems, as described below. This is especially true for portable systems that require power, space and computational resource conservation. However, in alternative embodiments, text independent systems can also be used with the present invention.

In general, text dependent systems require that the speaker utter a fixed predefined phrase. Users generally train the system by uttering one or more repetitions of the fixed predefined phrase used by the system. In a preferred embodiment of the present invention, a text dependent speaker verification system is used to randomly prompt the user to utter a phrase to gain access to the system. This type of system is referred to herein as a text-prompted speaker verification system. The system selects phrases from a collection of predefined words composed from a limited vocabulary set.

In one example, the limited vocabulary set comprises the digits zero through nine. In another embodiment, different words are used such as colors, names, and the like. In general any set of words can be used to comprise the limited vocabulary set.

The text-prompted speaker verification method is more complex, but provides higher security than the fixed phrase method. For example, using the text-prompted method, user passwords cannot be misappropriated by tape recording a speaker and then playing it back in response to the password prompt. In addition, the text-prompted method is preferred because users are not required to memorize passwords. This adds a much needed convenience that is not found in conventional security systems.

In general, two types of errors are associated with speaker verification systems, namely false accepts and false rejects. A false accepts occurs when an imposter is granted access to the system. A false reject occurs when a true speaker is denied access. As described below, a preferred embodiment of the present invention allows a user to adjust one type of error condition at the expense of the other type of error condition, in accordance with a preferred level of security.

For example, when high security level is desired, users can configure the system to generate a very low occurrence of false accepts at the expense of a high occurrence of false rejects. In this example, users would rather put up with the occasional false reject, and have to repeat the password, rather than allow the occasional false accept and risk unauthorized access.

Conversely, when a low security level is desired, users can configure the system to generate a very low occurrence of false rejects at the expense of an increased occurrence of false accepts. In this example, users would rather allow the occasional false accept rather than having to deal with high occurrences of false rejects, and thereby being forced to repeat the password to gain access. Details pertaining to this unique user selectable parameter are described below.

FIG. 1 is a block diagram depicting an operational environment in accordance with one embodiment of the present invention. An electronic device 2 comprises a speech input device 4, such as a microphone, that is used to accept speech input 6 from a user (not shown). Examples of electronic devices 2 include cellular telephones, PDAs, personal computer systems, ATMs, landline telephones, dictation devices, or any other type of electronic device.

It is noted that in many of the examples presented herein, a cellular telephone (or cell phone) is used as the electronic device 2. The use a cell phone 2 to describe a preferred embodiment is for exemplary purposes only and should not be construed to limit the scope and breadth of the present invention.

In one embodiment, a speaker verification module is embedded in the electronic device 2 to perform security functions and control system access. The speaker verification module 8 is used to process the speech input 6 and verify the identity of the speaker. More specifically, in one embodiment, the speaker verification module 8 is used to authenticate a particular user's speech based on predefined speech inputs stored in a storage device (not shown). The storage device (not shown) is part of the speaker verification module 8.

In another embodiment, the speaker verification module 8 is not embedded in the electronic device 2, but is remotely coupled to the device 2 through a network 10. In this example embodiment, the speaker verification module 8 is embedded in a sever 11 that is connected to the network 10. The network 10 in this example represents any type of computer and/or communications network and/or any combination thereof. For example, in one embodiment of the present invention, the device 2 is a cellular telephone and the network 10 is a cellular network coupled with a computer network. The computer network can be a private network such as a local area network, or a public network such as the Internet.

In another embodiment of the present invention, the electronic device 2 is any type of telephone. In this embodiment, the telephone 2 is used to access a remote service on the server 11, such as a bank account or the like.

The choice of whether to embed the speaker verification module 8 in the local or remote device (2 or 11), depends on several factors that should be considered when implementing particular embodiments of the present invention. For example, in one embodiment, where the device 2 is a cell phone, the speaker verification module 8 can reside in either the local or remote device.

In this example, an advantage of embedding the speaker verification module 8 in the remote device 11 is the virtually unlimited availability of computing power and storage space. A disadvantage of locating the speaker verification module 8 in the sever 11, is that the speech signal 6 must travel through the network 10 before being processed. Thus, using the remote embodiment 11, the speech signal 6 is highly susceptible to noise and signal degradation, which can adversely effect speaker verification techniques.

Accordingly, because increased noise and signal degradation considerably complicates the task of speaker verification, the speaker verification module 8 is preferably embedded in the device 2. This embodiment is referred to herein as the "local embodiment." Due to practical limitations, however, the local embodiment can also be problematic. For example, portable devices, such as cell phones and the like, have limited space and power resources. Thus, in order to implement the local embodiment, the speaker verification module 8 must be sufficiently efficient so that it can be implemented using the limited computing, power and storage resources available in a portable device.

An example of a method that can be used in conjunction with the present invention is disclosed in the co-pending U.S. patent application Ser. No. 09/408,453, which is incorporated herein by reference. An example of this technique disclosed by the above referenced patent application is briefly described below.

Figure 2:
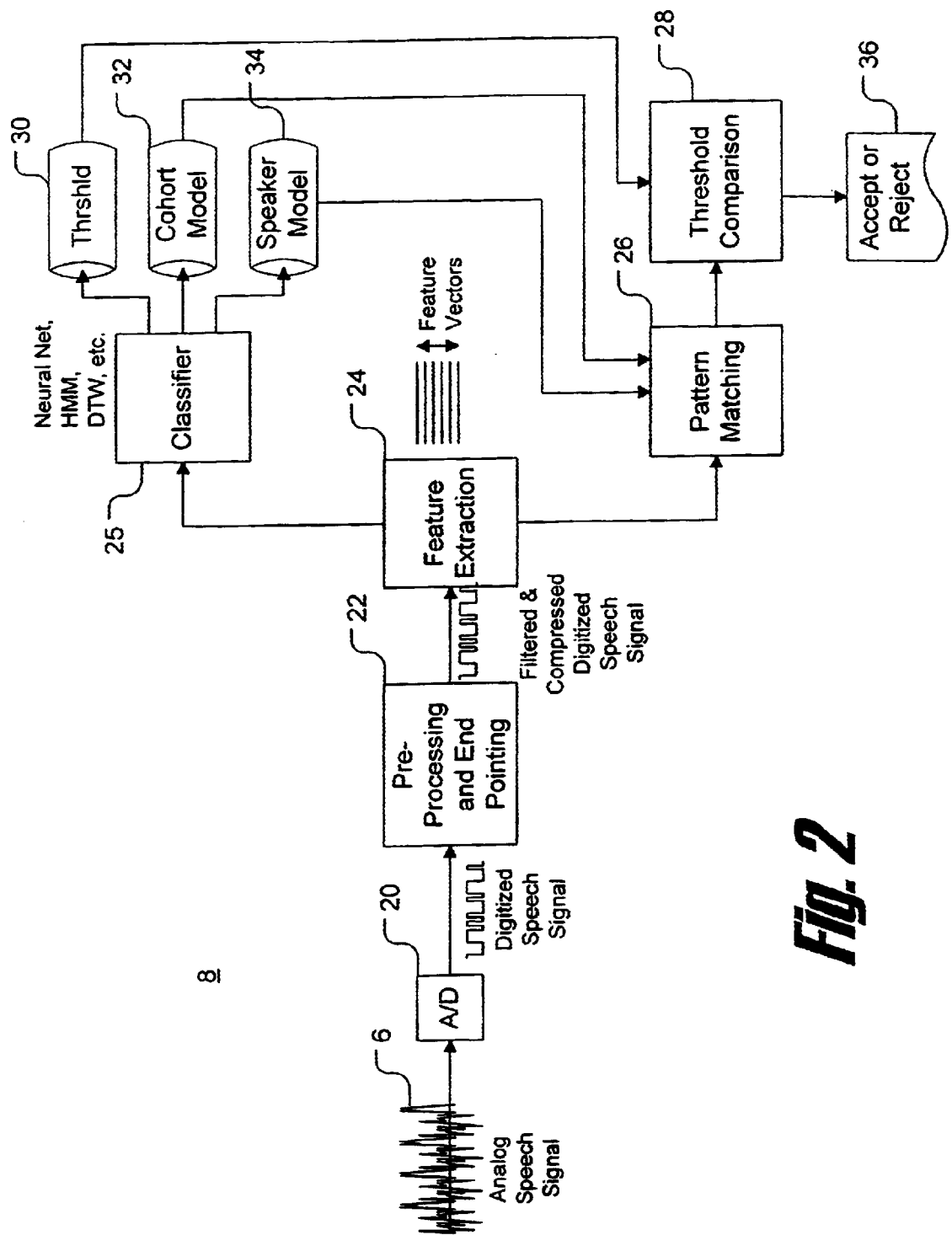
FIG. 2 is a block diagram depicting an example of typical components comprising a speaker verification module in accordance with an embodiment of the present invention.

FIG. 2 is a block diagram depicting an example of typical components comprising a speaker verification module 8 in accordance with one embodiment of the present invention. An analog to digital (A/D) converter module 20 is used to convert a speech signal 6 into a digital speech signal, using standard well-known sampling techniques.

A preprocessing and end-pointing module 22 is used to process the digitized speech signal to filter the signal and remove unnecessary items such as periods of silence. For example, periods of silence at the beginning, the end and between words are typically discarded. Further, the preprocessing module 22 typically filters the signal to eliminate, for example, speech artifacts caused by the digitizing process in the A/D converter 20. Consequently, the output from the preprocessing module 22 is a more compact and cleaner digitized speech signal.

Next, the output from the pre-processing module 22 is used as input to a feature extraction module 24. The feature extraction module 24 takes the filtered digitized speech signals and converts it to feature vectors. In this example, feature vectors are the result of a process that extracts relevant portions of the digitized speech sample. The contents of the feature vectors include spectral information. Thus, in a typical application, multiple speech samples are compressed into a much smaller number of samples comprising spectral information.

The next path taken in the process depends on whether the process is executed during an enrollment phase or during speaker verification phase. The enrollment phase is used to train the system for particular users. The speaker verification phase is used to authenticate users during the operation of the security system. In this example, the enrollment phase is represented by the upper portion of FIG. 2, and the speaker verification phase is represented by the lower portion.

Accordingly, during the enrollment phase, a classifier module 25 is used to create a speaker model. The input speech streams are used to extract the user's voice biometrics and create a speaker model 34 therefrom. Many different methods can be used to the create speaker model 34. For example, the classifier may contain a neural network that is used for the purpose of creating the speaker model 34. Other well known techniques that can be used include the Hidden Markov Model (HMM) and the dynamic time warping (DTW).

Where, the speaker model 34, represents a particular speaker's voice, the cohort model 32, represents the voice of all other people. In particular, the cohort model 32 is used to distinguish a particular speaker's voice from all others. Utterances are compared against both the cohort model 32 and the speaker model 34 in two separate comparisons. Ideally, an authorized user will score high against the speaker model 34 and low against the cohort model 32. The threshold database 30 is used to store values associated with these scores to determine whether a match or mismatch occurs.

Accordingly, two models 34 and 32 are used rather than a single speaker model 34 to increase the reliability of the speaker verification system 8. The interaction between the threshold database 30, the cohort model 32, and the speaker model 34 is best illustrated with an example. In this example, it is assumed that the system 8 assigns a score from 0–100, for each speech utterance comparison made against a particular model. That is, for a perfect score, one would expect to score 100 against the speaker model 34, and zero against the cohort model. In reality, such scores are rarely achieved, as the example below illustrates.

During a typical training phase, the speaker verification system 8 prompts the user to utter a certain word or phrase a multiple number of times. For the purposes of this example, it is assumed that the following scores are a result of this type of training session.

| Score Against Speaker Model | Score Against Cohort Model |
| --- | --- |
| 50 | 40 |
| 70 | 29 |
| 80 | 61 |
| 55 | 45 |
| Ave: 64 | Ave: 44 |

In this example, the average score for the utterances when compared against the speaker model is 64. The average score for the same utterances when compared against the cohort model is 44. These values can be used to set threshold values for match determination. Thus for example, one could set a threshold value of 44 for the cohort model, and a threshold value of 64 for the speaker model. Using this simplistic approach, a match is established if the score from a future utterance of the same word or phrase, is 44 or below against the cohort model, and 64 or above against the speaker model.

In practice however, this simplistic scheme is not very efficient. For example, different conditions, such as background noises, etc., and normal variations in a people's voices, can result in dramatically different scores on different occasions. However, taking these changing conditions into account, it has been determined that the difference in scores between the cohort model 34 and the speaker model 34 remain relatively constant.

Therefore, this differential value (i.e. the difference in scores between the cohort and speaker models), rather than the raw scores, is used to determine matches. For example, suppose that an average differential between the scores against the speaker and cohort models is 20 percent. In this case, a match will be found for future utterances if the speaker score is at least 20 percent greater than the cohort score.

Referring back now to FIG. 2, the speaker verification phase of a speaker verification module 8, will now be described. During the speaker verification phase, the feature vectors, constructed by the feature extraction module 24 are input into the pattern matching module 26.

As shown, the pattern matching module 26 is coupled with both the cohort model 32 and speaker model 34. The pattern matching module 26 is where a particular score is generated for each of the speaker and cohort models 34 and 32 respectively.

Next, as indicated, the threshold comparison module 28 is used to determine, based on the threshold database 30, and the concepts described above, (and in the above referenced co-pending patent application), whether to accept or reject the speaker. As indicated, the output from the threshold comparison module 28 is either an accept or reject decision.

Note that this is just one example of a means for implementing a speaker verification system 8. Other methods can be used. It is noted however, that the present invention can be used with any type of known or future speaker verification system. In fact, the present invention can also be used with other forms of speaker or speech recognition systems. After reading the present disclosure, the adaptability of the present invention to other forms of speech recognition systems would be apparent to persons skilled in the relevant art(s). Accordingly, the examples used herein should not be construed to limit the scope and breadth of the present invention.

Figure 3:
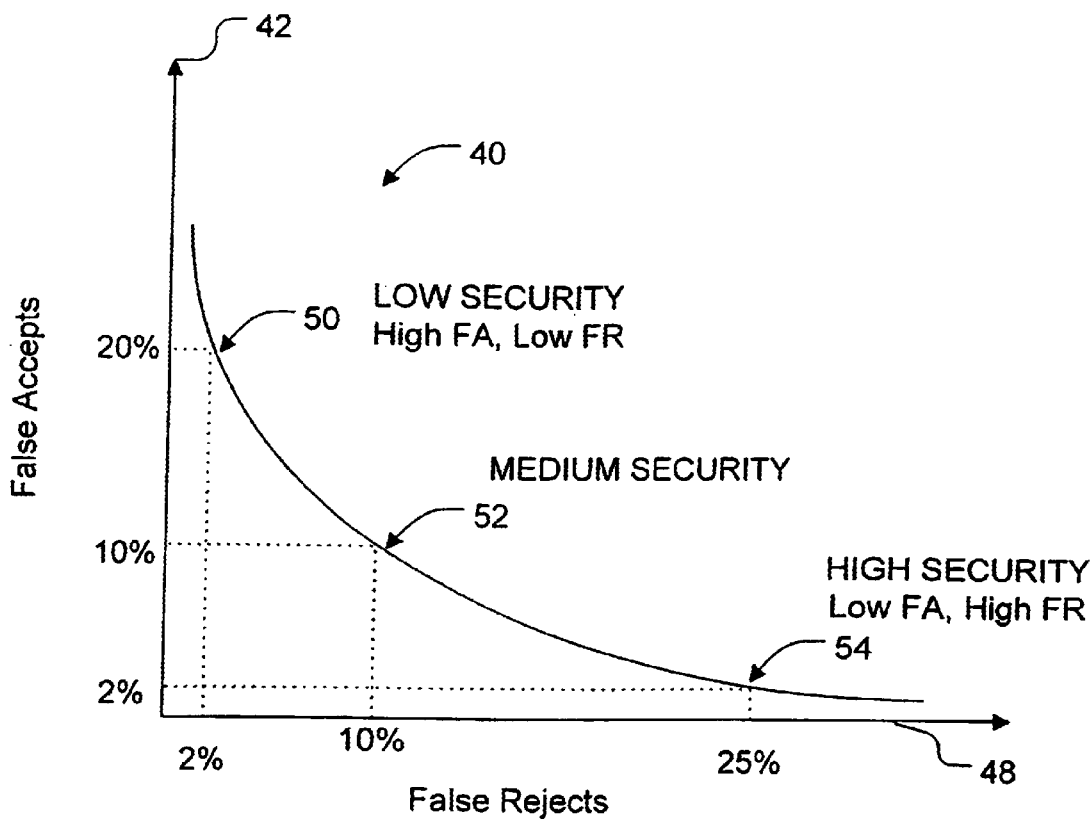
FIG. 3 is a graph depicting types of errors associated with a typical speaker verification system.

FIG. 3 is a graph depicting types of errors associated with a typical speaker verification system. Because this is a binary system, i.e. an accept or reject decision, the types of errors are false accepts 42, as shown on the vertical axis, and false rejects 48 as shown on the horizontal axis. A false accept occurs when an imposter is recognized by the system 8 as an authorized user. A false reject occurs when an authorized speaker is not recognized by the system 8 and is therefore not allowed to gain access.

By adjusting the threshold 30, as described above, a particular security level can be provided by allowing one type of error to be prevalent over the other type of error. For example, as shown by reference point 50, by setting a high false accept threshold, the system 8 would generate very low occurrences (2%) of false rejects and very high occurrences (20%) of false accepts. A threshold setting at this level makes it highly likely that an imposter can gain access to the system. At the same time, however, a false reject by the system is very infrequent.

Accordingly, a high level of security is realized when the speaker verification module 8 is programmed such that very strict values are used to determine whether a match occurs. That is, scores that are very close to the scores achieved during training are used to determine matches. The downside to using this level of security, of course, is that it opens up the possibility of having a high occurrence of false rejects.

Conversely, if the scores standard is more relaxed, and are allowed to deviate from the scores achieved during training, a low level of security is realized. The downside to this approach is that a higher number of false accepts are possible.

But in some cases, users would be more willing to risk access by unauthorized users in some applications, rather than dealing with a high number of false rejections, in which case, the user has to reattempt system access. This would be true for low level security applications.

Towards the other end of the spectrum, as shown by reference point 54, a threshold setting at this level, yields high occurrences (25%) of false rejects and low occurrences (2%) of false accepts. This represents a very high level of security, where a user would rather put up with false rejects, rather than risking even low occurrences of false entries into the system.

A significant advantage of the present invention is that the user can select a desired level of security for each application. For example, for one application, such as a bank account or the like, a user may select a very high level of security. In this case, the user will likely select a level of security near point 54 on the high security end of the spectrum.

Similarly, for a less secure application such as home computer system or the like, a user may select a low level of security. In this case, the user will select a level of security near point 50 on the low end of the security spectrum. For another application, such as a cell phone, a user may select a medium level of security at some point in-between the high and low ends, such as point 52, for example.

Figure 4:
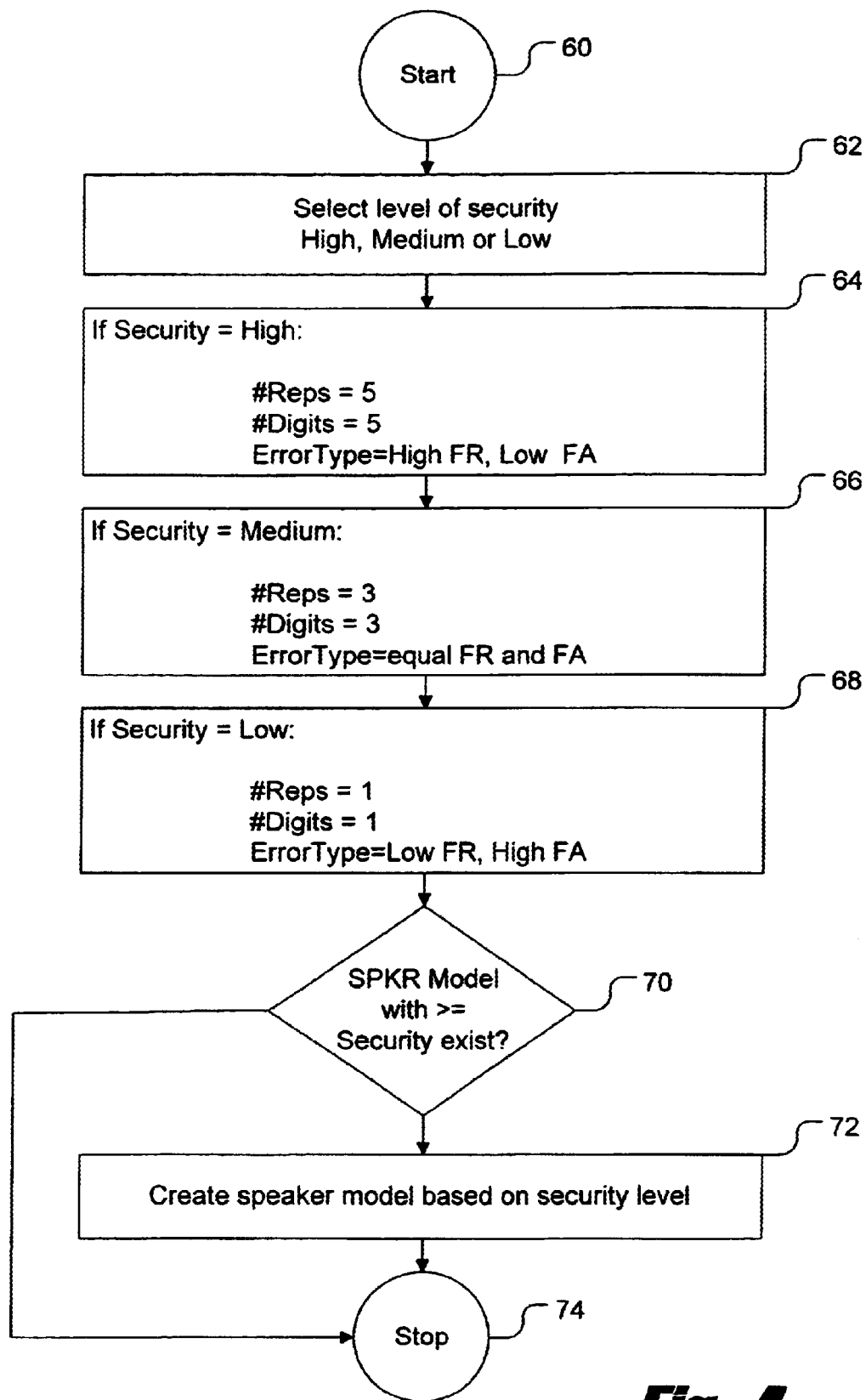
FIG. 4 is a flowchart that is useful for describing an example process that can be used to implement an embodiment of the present invention.

FIG. 4 is a flowchart that is useful for describing an example process that can be used to implement the present invention. The process begins with step 62. In step 62, the user is asked to select a particular level of security. In this example, the user is presented with a choice of either a high, medium or low security level. In another embodiment, the user is given more flexibility. For example, in one embodiment, the user is asked for a level of security from 1 to 100.

Next, as indicated by steps 64–68, three user configurable parameters are assigned values based on the level of security selected in step 62. The first parameter is the number of repetitions used to train the system, during the training phase. Accordingly, as the level of security increases, so does the number of repetitions required to train the system.

For example, as shown in step 64, if a high level of security is selected, the number of repetitions is set to 5. As shown in step 66, if a medium level of security is selected, the number of repetitions is set to 3. As shown in step 68, if a low level of security is selected, the number of repetitions is set to 1.

The second parameter that is set is steps 64–68 is the number of words (in this case, digits) used to create a password. Generally, as the level of security increases, so does the number of words used for the password. For example, as shown in step 64, if a high level of security is selected, the number of words (digits) is set to 5. As shown in step 66, if a medium level of security is selected, the number of words (digits) is set to 3. As shown in step 68, if a low level of security is selected, the number of digits is set to 1.

The third parameter that is set in steps 64–68 is the adjustment made to the speaker verification module 8 based on the desired error type, as described above. In particular, using the example described above, the threshold values are adjusted to accommodate the particular level of security desired.

Thus, as indicated by step 64, if a high level of security is selected in step 62, the threshold value is chosen such that false rejects occur more often than false accepts. As indicated by step 66, if a medium level of security is selected, the threshold values are adjusted such that the frequency of false rejects are approximately equal to the frequency of false accepts. As indicated by step 68, if a low level of security is selected, the threshold values are adjusted such that the false accepts occur more frequently than the false rejects.

Next, as indicated by step 70, the process determines whether a speaker model exists, in the speaker model storage 34, that is equal to or greater than the level of security selected. For example, if all of the digits have already been learned from a previous training system, in which the number of repetitions are at least equal to the number of repetitions set above, then there is no need to train the system again.

But if such a speaker model does not exist, then it is necessary to create a speaker model as shown in step 72. This is generally accomplished by prompting the user to repeat each digit a number of times equal to the number of repetition parameters set above. Next, as indicated by step 74, the process ends.

It is noted that in the above example, it is assumed that the passwords generated by the system comprise one or more digits, depending on the security level, where the digits are the words "zero", "one", "two", "three", "four", "five", "six", "seven", "eight", and "nine". However, in other embodiments, the passwords may comprise any word or phrase.

In another embodiment, the set of words that can be used to create passwords is also adjusted, based on the desired level of security. For example, for a low security application, only the digits "one", "two" and "three" are used. This of course, also reduces the amount of training time necessary. For higher levels of security, more digits, or other words, phases, etc. are added to the set of possible words used to create passwords. Accordingly, the set of words used to create passwords is yet another parameter that would be set in steps 64–68, based on the level of security selected in step 62.

Figure 5:
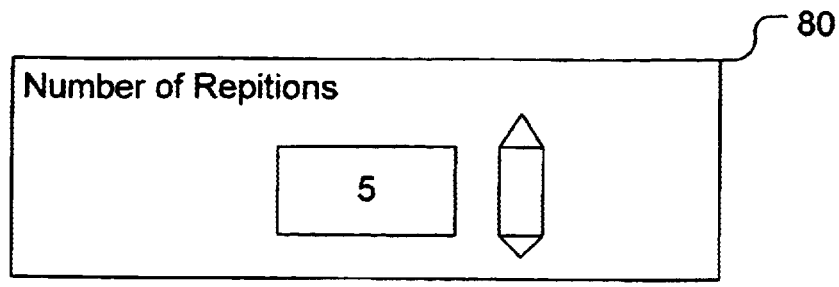
FIG. 5 is an example of user interface components that can be used to implement the present invention.
Figure 5:
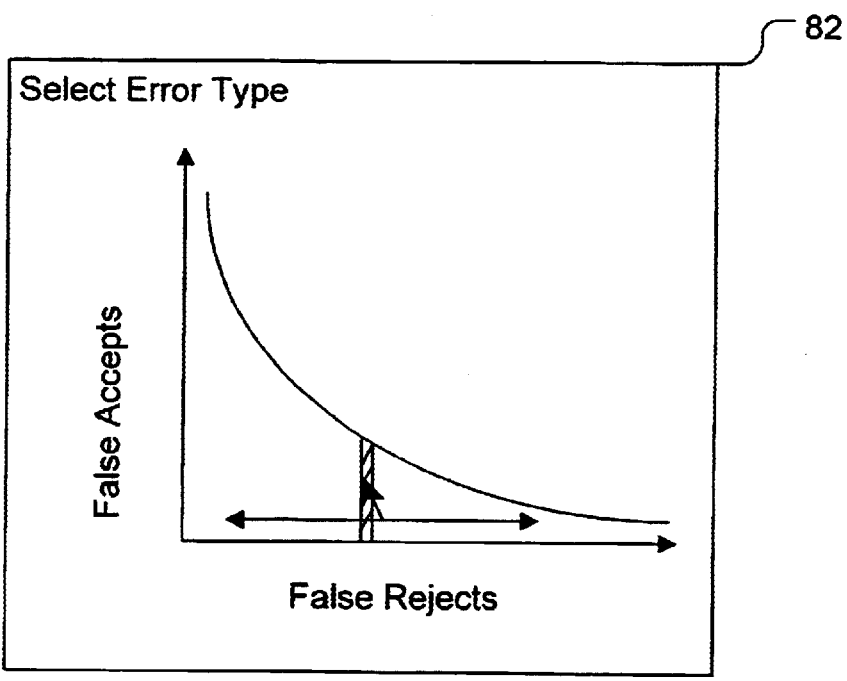
Figure 5:
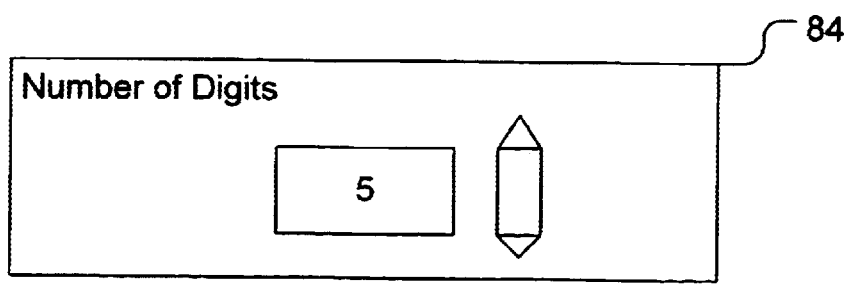

FIG. 5 is an example of user interface components that can be used to implement the present invention, when used with a device 2, that includes some kind of display screen, such as a personal computer. In addition, even for embodiments that lack a display screen, FIG. 5 is useful for describing the type of user input data that can be used with any embodiment of the present invention. Other types of user interfaces that can be used with other types of devices would be apparent to persons skilled in the relevant art(s).

User interface 80 depicts a dialog box in which a user can select a desired number of repetitions required to train the system. The greater the number of repetitions, the greater the security level.

User interface 82 depicts a dialog box that allows the user to select a desired false accept frequency verses false reject frequency. In this example, the user drags a bar under the graph to the desired location to set a customized level of security. In this example, the graph in user interface 82 is similar to the graph shown in FIG. 3.

User interface 84 depicts a dialog box in which a user can select a desired number of digits for generated passwords. The greater the number of repetitions, the greater the security level. A similar interface can be used to select the number of words in the set of words used to generate passwords. In another embodiment, the user can select a list of words that can be used to generate passwords.

Figure 6:
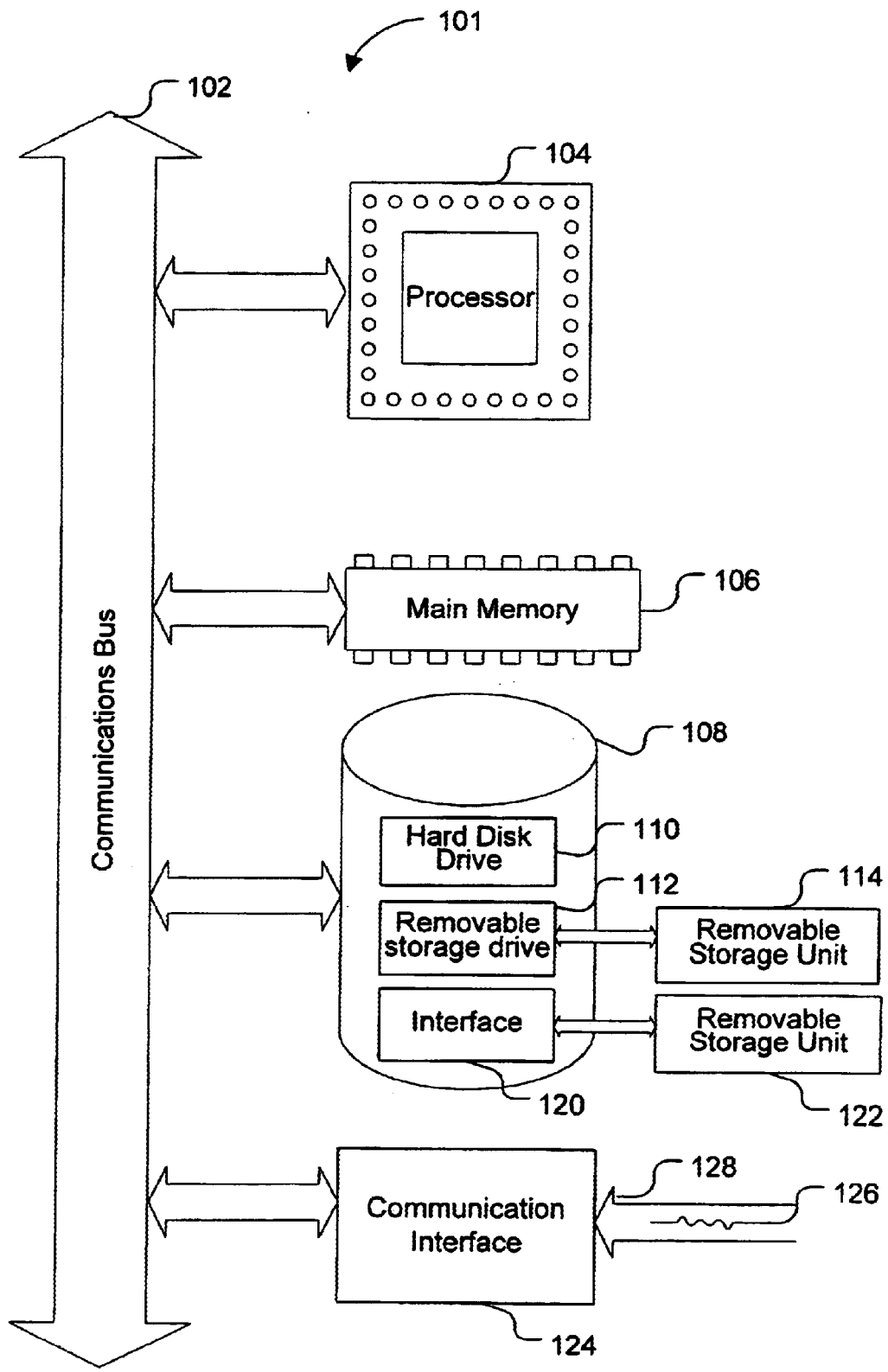
FIG. 6 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 101 is shown in FIG. 6. The computer system 101 includes one or more processors, such as processor 104. The processor 104 is connected to a communication bus 102. Various software embodiments are described in terms of this example computer system. After reading this description, it will become apparent to a person skilled in the relevant art how to implement the invention using other computer systems and/or computer architectures.

Computer system 102 also includes a main memory 106, prefer ably random access memory (RAM), and can also include a secondary memory 108. The secondary memory 108 can include, for example, a hard disk drive 110 and/or a removable storage drive 112, representing a floppy disk drive, a magnetic tape drive, an optical disk drive, etc. The removable storage drive 112 reads from and/or writes to a removable storage unit 114 in a well-known manner. Removable storage unit 114, represents a floppy disk, magnetic tape, optical disk, etc. which is read by and written to by removable storage drive 112. As will be appreciated, the removable storage unit 114 includes a computer usable storage medium having stored therein computer software and/or data.

In alternative embodiments, secondary memory 108 may include other similar means for allowing computer programs or other instructions to be loaded into computer system 101. Such means can include, for example, a removable storage unit 122 an d an interface 120. Examples of such can include a program cart ridge an d cartridge interface (such as that found in video game devices), a removable memory chip (such as an EPROM, or PROM) and associated socket, and other removable storage unit s 122 and interfaces 120 which allow software and data to be transferred from the removable storage unit 122 to computer system 101.

Computer system 101 can also include a communications interface 124. Communications interface 124 allows software and data to be transferred between computer system 101 an d external devices. Examples of communications interface 124 can include a modem, a network interface (such as an Ethernet card), a communications port, a PCM-CIA slot and card, etc. Software and data transferred via communications interface 124 are in the form of signals which can be electronic, electromagnetic, optical or other signals capable of being received by communications interface 124. These signals 126 are provided to communications interface via a channel 128. This channel 128 carries signals 126 and can be implemented using wire or cable, fiber optics, a phone line, a cellular phone link, an RF link and other communications channels.

In this document, the terms "computer program medium" and "computer usable medium" are used to generally refer to media such as removable storage device 112, a hard disk installed in hard disk drive 110, and signals 126. These computer program products are means for providing software to computer system 101.

Computer programs (also called computer control logic) are stored in main memory and/or secondary memory 108. Computer programs can also be received via communications interface 124. Such computer programs, when executed, enable the computer system 101 to perform the features of the present invention as discussed herein. In particular, the computer programs, when executed, enable the processor 104 to perform the features of the present invention. Accordingly, such computer programs represent controllers of the computer system 101.

In an embodiment where the invention is implemented using software, the software may be stored in a computer program product and loaded into computer system 101 using removable storage drive 112, hard drive 110 or communications interface 124. The control logic (software), when executed by the processor 104, causes the processor 104 to perform the functions of the invention as described herein.

In another embodiment, the-invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for configuring a user configurable level of security for use in a speech recognition security system, the method comprising the steps of:

accepting an input from the user, the input identifying the user and indicating a desired level of security for configuring the speech recognition security system;

dynamically adjusting at least one of a set of parameters governing the speech recognition security system in accordance with the desired level of security for the particular application;

determining if the speech recognition security system includes a first speaker model created for the identified user, the first speaker model having a security level equal to or greater than the desired level of security; and creating a second speaker model for the identified user by training the speech recognition security system if the determining step determines that the speech recognition security system does not include the first speaker model.

2. The method of claim 1, wherein the step of dynamically adjusting at least one of a set of parameters governing the speech recognition security system includes the step of updating a parameter that defines the number of repetitions used to train the speech recognition system in accordance with the desired level of security.

3. The method of claim 2, wherein the defined number of repetitions increase as the desired level of security increases.

4. The method of claim 2, wherein the defined number of repetitions decrease as the desired level of security decreases.

5. The method of claim 1, wherein the step of dynamically adjusting at least one of a set of parameters governing the speech recognition security system includes the step of updating a parameter that defines the number of words used to create passwords in accordance with the desired level of security.

6. The method of claim 5, wherein the defined number of words increase as the desired level of security increases.

7. The method of claim 5, wherein the defined number of words decrease as the desired level of security decreases.

8. The method of claim 1, wherein the step of dynamically adjusting at least one of a set of parameters governing the speech recognition security system includes the step of updating a parameter that defines the frequency of false accept errors versus the frequency of false reject errors in accordance with the desired level of security.

9. The method of claim 8, wherein the parameter is updated such that the frequency of false rejects increase and the frequency of false accepts decrease as the desired level of security increases.

10. The method of claim 8, wherein the parameter is updated such that the frequency of false rejects decrease and the frequency of false accepts increase as the desired level security decreases.

11. The method of claim 1, wherein the step of dynamically adjusting at least one of a set of parameters governing the speech recognition security system includes the step of updating a parameter that defines the set of words used to create passwords in accordance with the desired level of security.

12. The method of claim 11, wherein the defined set of words used to create passwords increase in number as the desired level of security increases.

13. The method of claim 11, wherein the defined set of words used to create passwords decrease in number as the desired level of security decreases.

14. The method of claim 1, wherein the speech recognition system is a speaker verification system.

15. The method of claim 14 wherein the speaker verification system is a text dependant speaker verification system.

16. The method of claim 14 wherein the speaker verification system is a text independent speaker verification system.

17. The method of claim 1 further comprising the step of comparing a speech of said user against said first speaker model and a cohort model to identify said user.

18. The method of claim 1 further comprising the step of comparing a speech of said user against said second speaker model and a cohort model to identify said user.

19. The method of claim 1 further comprising: creating the second speaker model for the identified user based on the first speaker model if the determining step determines that the speech recognition security system includes the first speaker model.

20. A user configurable speech recognition security system comprising:

an input device for accepting an input from the user, the input identifying the user and indicating a desired level of security for configuring the speech recognition security system;

an adjusting means for dynamically adjusting at least one of a set of parameters governing the speech recognition security system in accordance with the desired level of security;

a determining means for determining if the speech recognition security system includes a first speaker model created for the identified user, the first speaker model having a security level equal to or greater than the desired level of security; and a creating means for creating a second speaker model for the identified user by training the speech recognition security system if the determining means determines that the speech recognition security system does not include the first speaker model.

21. The system of claim 20, wherein the adjusting means includes means for updating a parameter that defines the number of repetitions used to train the speech recognition system in accordance with the desired level of security.

22. The system of claim 20, wherein the adjusting means includes means for updating a parameter that defines the number of words used to create passwords in accordance with the desired level of security.

23. The system of claim 20, wherein the adjusting means includes means for updating a parameter that defines the frequency of false accept errors versus the frequency of false reject errors in accordance with the desired level of security.

24. The system of claim 20, wherein the adjusting means includes means for updating a parameter that defines a set of words used to create passwords in accordance with the desired level of security, wherein the number of words in the set is proportional to the desired level of security.

25. The system of claim 20, wherein the electronic device is a telephone.

26. The system of claim 25, wherein the speech recognition system is installed on a remote server coupled with a telephone network.

27. The system of claim 20, wherein the electronic device is a cellular handset.

28. The system of claim 20, wherein the electronic device is a personal digital assistant.

29. The system of claim 20, wherein the electronic device is a personal computer system.

30. The system of claim 20 further comprising a comparison means for comparing a speech of said user against said first speaker model and a cohort model to identify said user.

31. The system of claim 20 further comprising a comparison means for comparing a speech of said user against said second speaker model and a cohort model to identify said user.

32. The system of claim 20, wherein the creating means creates the second speaker model for the identified user based on the first speaker model if the determining step determines that the speech recognition security system includes the first speaker model.

33. A computer program product comprising a computer useable medium having computer program logic stored therein, said computer program logic for enabling a computer to configure a user configurable level of security for use in a speech recognition security system, said computer program logic comprising:

an input device for accepting input from the user, the input identifying the user and indicating a desired level of security for configuring the speech recognition security system; an adjusting means for dynamically adjusting at least one of a set of parameters governing the speech recognition security system in accordance with the desired level of security;

a determining means for determining if the speech recognition security system includes a first speaker model created for the identified user, the first speaker model having a security level equal to or greater than the desired level of security; and a creating means for creating a second speaker model for the identified user by training the speech recognition security system if the determining means determines that the speech recognition security system does not include the first speaker model.

34. The computer program product of claim 33, wherein the adjustment means includes means for updating a parameter that defines the number of repetitions used to train the speech recognition system in accordance with the desired level of security.

35. The computer program product of claim 33, wherein the adjustment means includes means for updating a parameter that defines a number of words used to create passwords in accordance with the desired level of security.

36. The computer program product of claim 33, wherein the adjustment means includes means for updating a parameter that defines the frequency of false accept errors versus the frequency of false reject errors in accordance with the desired level of security.

37. The computer program product of claim 33, wherein the adjustment means includes means for updating a parameter that defines the set of words used to create passwords in accordance with the desired level of security.

38. The computer program product of claim 33 further comprising a comparison means for comparing a speech of said user against said first speaker model and a cohort model to identify said user.

39. The computer program product of claim 33 further comprising a comparison means for comparing a speech of said user against said second speaker model and a cohort model to identify said user.

40. The computer program product of claim 33, wherein the creating means creates the second speaker model for the identified user based on the first speaker model if the determining step determines that the speech recognition security system includes the first speaker model.

* * * * *